Figure 1:
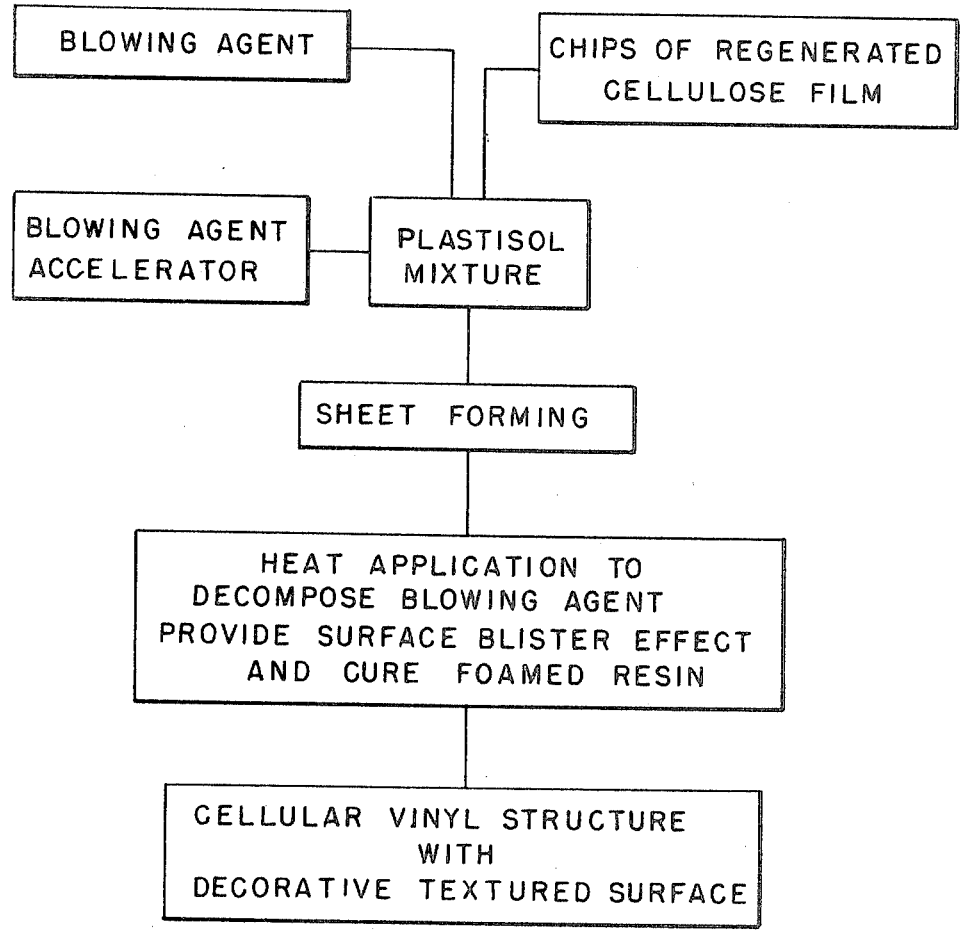

United States Patent

Nelson

[15] 3,639,160
[45] Feb. 1, 1972

[54] METHOD OF MAKING A CELLULAR STRUCTURE HAVING A DECORATIVE TEXTURED SURFACE

[72] Inventor: Dorsey C. Nelson, Springfield, Pa.
[73] Assignee: FMC Corporation, Philadelphia, Pa.
[22] Filed: Apr. 17, 1968
[21] Appl. No.: 722,098

[52] U.S. Cl. ..........................117/161 C, 161/168, 117/166, 260/2.5, 264/47, 264/54, 264/DIG. 60, 161/116
[51] Int. Cl..........................................................B44d 1/09
[58] Field of Search .........................161/116, 160, 168, 162; 260/2.5 P; 264/45, 47, 54, 53, 51, 47, DIG. 60; 161/162; 117/41, 62, 161, 166

[56] References Cited

UNITED STATES PATENTS

| | | | |
|---|---|---|---|
| 2,918,702 | 12/1959 | Wetterau | 264/47 |
| 2,989,431 | 6/1961 | Cole | 161/162 |
| 3,113,116 | 12/1963 | Smythe | 260/2.5 P |
| 3,194,856 | 7/1965 | Palmer | 161/162 |
| 3,267,187 | 8/1966 | Slosberg et al. | 161/116 |
| 3,423,273 | 1/1969 | Mazur | 264/45 |

*Primary Examiner*—Morris Sussman
*Attorney*—Thomas R. O'Malley, George F. Mueller and Eugene G. Horsky

[57] ABSTRACT

A method of making a cellular structure having a decorative textured or grained and leatherlike surface formed by foaming a vinyl resin plastisol containing a blowing agent and chips of regenerated cellulose film having absorbed moisture followed by curing of the foamed structure.

7 Claims, 2 Drawing Figures

METHOD OF MAKING A CELLULAR STRUCTURE HAVING A DECORATIVE TEXTURED SURFACE

The present invention is directed to a method of making a cellular or foamed structure having a textured or grained and leatherlike surface.

The manufacture of cellular or foamed sheets of vinyl resins is known in the art. In general, such sheets may be formed by first mixing together a vinyl resin, such as polyvinyl chloride, a plasticizer for such resin, and a blowing agent, which decomposes when heated to between the glass transition and decomposition temperatures of the vinyl resin. This mixture is spread as a thin layer and heated to activate the blowing agent and effect curing of the foamed vinyl resin.

If it is desired that such cellular vinyl structure possess a decorative textured or patterned surface the mixture, after being spread and prior to heating, may be pretreated to at least minimize resin foaming along selected areas thereof. Alternately, the formed cellular vinyl sheet may perhaps be embossed in a conventional manner to effect collapse of its expanded structure along desired portions thereof. With both of these texturizing or patterning procedures, the vinyl sheets will have areas in which its cellular structure is substantially reduced or collapsed or perhaps completely absent. Accordingly, a primary object of this invention is to provide a generally new or improved and more satisfactory method of making a cellular structure of vinyl resin having a decorative textured or grained surface.

Another object of the invention is to provide a method for making an improved cellular structure of vinyl resin having a decorative textured or grained surface which is leatherlike in appearance.

Another object is the provision of a structure of vinyl resin having a body of generally uniform cellular character and a decorative textured or grained surface.

Still another object is the provision of a method in which a foamed or cellular vinyl resin is formed with a decorative textured or grained surface without any surface pretreatment of the foamable vinyl resin or aftertreatment of the cellular vinyl structure itself.

A further object is the provision of a method in which a foamable vinyl resin is caused to assume a cellular structure and a decorative textured or grained surface generally concomitantly with the heat curing thereof.

Figure 2:
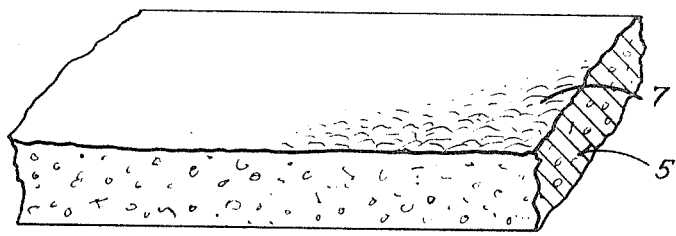

In the drawing,

FIG. 1 is a flow diagram showing the steps of the method of the present invention; and FIG. 2 illustrates a portion of a foamed or cellular structure as made by the method of the present invention.

These and other objects of the invention are provided by a method in which a mixture, including a foamable plastisol, formed of a vinyl resin, a plasticizer for such resin and a chemical blowing agent, and chips of regenerated cellulose film containing absorbed water, is spread as a layer and then heated to activate the blowing agent and effect curing of the resulting foam structure. The presence of the chips of regenerated cellulose film in the mixture provide the resulting cellular structure with a textured or blistered leather-grain or frog-skin leather surface.

Polyvinyl chloride is the preferred resin for use in the present invention, although copolymers of polyvinyl chloride with vinyl acetate, vinylidene chloride, vinyl propionate, vinyl butyrate diethyl maleate, diethyl fumarate and the like may be used.

Plastisols of vinyl resins, and particularly polyvinyl chloride plastisols, are well known in the art and generally comprise a dispersion of a finely divided vinyl polymer and a plasticizer therefor. Generally from 20 to 150 or more parts, by weight, of plasticizer are used for each 100 parts of the vinyl resin. Such plastisol may flow readily or perhaps have the consistency of a thick slurry which can be spread to provide a layer of desired thickness. Plasticizers generally employed in such formulations, and suitable for use in the present invention, include didecylphthalate, dioctylphthalate, di-2-ethylhexyl phthalate, dibutyl phthalate, tricresyl phosphate, dioctyl adipate, etc. Fillers, stabilizers, colorants, and other conventional plastisol ingredients may be included if desired.

The density of the resulting foamed structure preferably ranges from about 10 to 50 pounds per cubic foot and is dependent upon the quantity and efficiency of the blowing agent. Generally, from about 0.5 to 15.0 percent, by weight of blowing agent is employed and is thoroughly blended with the resin plastisol. Azodicarbonamide is a preferred chemical blowing agent for use with polyvinyl chloride plastisols in the method of the present invention, although other similar materials may be employed, such as azobisisobutyronitrile, N,N'-dimethyl-N,N'-dinitrosoterephthalamide, p,p'-Oxybis(benzenesulfonylhydrazide), p,p'-Oxybis(benzenesulfonyl semicarbazide), barium azodicarboxylate, dinitroisopentamethylenetetramine, etc.

In the method of the present invention it is necessary that the blowing agent should be essentially completely decomposed when the plastisol is heated within a temperature range between the glass transition and decomposition temperatures of the vinyl resin, and more particularly within a range below the gelation temperature of the plastisol. Gelation, which is dependent upon temperature as well as duration of heating, converts the normally flowable plastisol into an immobile or "-set" condition. Upon further heating from this gel state the composition passes into a fluxed or fused state in which the vinyl resin and plasticizer become dissolved in each other in a single phase formation. While in this latter condition, the composition does become more fluid when heated to elevated temperatures, its degree of mobility, and thus ability to foam, is much less than that of the plastisol prior to gelation.

To achieve foaming of the plastisol within a desired temperature range as described above, the decomposition temperature of the solid blowing agent may be reduced by the incorporation of an accelerator. A variety of such accelerator compounds are known in the art and are commercially available.

THe weight ratio of regenerated cellulose film chips to plastisol may range from 1:10 to 1:100 depending upon the degree of texture desired along the surface of the resulting product. Such chips are preferably of a size as to pass through screens having an mesh opening of from less than about one thirty-second to one-fourth inch.

The texturizing or graining along the surface of the foamed or cellular vinyl resin structure is due to a blister effect provided by the absorbed or latent moisture in the chips of regenerated cellulose film during the heating thereof. Thus, the size and amount of chips regenerated cellulose film employed as well as the moisture content of such chips govern the degree to which the surface of the foamed cellular structure is roughened or made coarse, Regenerated cellulose film chips having less than about 0.10 percent absorbed moisture provide for no significant roughening of the surface of a finished cellular polyvinyl chloride structure, while chips having more than about 10.0 percent absorbed moisture result in a cellular polyvinyl chloride structure having a well-blistered surface which may perhaps be considered excessive for many decorative applications.

Conventional regenerated cellulose film, with or without a plasticizer, may be ground or flaked to provide chips of desired sizes. Chips made from commercially available regenerated cellulose film, containing from about 5.0 to 15.0 percent, by weight, of glycerine or glycol as a plasticizer, assume a tan color when heated under the conditions as described above. The depth of color imparted to the finished cellular structure depends, of course, upon the amount of chips employed as well as the amount of plasticizer in such chips. Thus, the foamed structure formed by the method of the present invention may range in color from one which is generally white where chips formed of unplasticized regenerated cellulose film are used, to one which resembles a tanned leather.

The mixture of vinyl plastisol, blowing agent and chips of regenerated cellulose film may be applied, as for example, by a roll or knife-blade, to a strippable carrier or one to which it may readily bond to form a laminated product. Strippable carriers may be formed of Teflon-coated fabrics, polyester films, unplasticized polyphenylene oxide film, etc. Vinyl films, textile fabrics, paper and the like may be employed as carriers or substrates which are to remain intact in making foam laminates.

In making cellular or foamed sheets, the mixture is preferably deposited to a depth of from about 5 to 100 mils, and more desirably from about 25 to 30 mils.

Heat, to activate the blowing agent and effect curing of the foamed vinyl resin, may be applied by any suitable means. Infrared heating panels have proven to be highly efficient for this purpose, especially in making foamed or cellular structures in sheet or web form.

The steps of the method of the present invention as discussed are shown in the flow diagram of FIG. 1 of the drawing. A vinyl structure as produced by the described method is shown in FIG. 2 and includes a foamed or cellular body 5 having a decorative roughened or coarse top surface 7. As heretofore mentioned, the top surface 7 of the resulting cellular structure can be varied in texture and resembles grained leather, especially if a tan color had been imparted to the structure by the use of plasticized regenerated cellulose film chips.

The invention is further illustrated by the following examples:

EXAMPLES I-V

A foamable plastisol was prepared having the following formulation:

| | Parts By Weight |
|---|---|
| Dispersion Type Polyvinyl Chloride Resin | 100 |
| Propylene Glycol Dibenzoate primary plasticizer | 45 |
| Dicapryl phthalate primary plasticizer | 35 |
| Epoxidized Soybean Oil secondary plasticizer | 5 |
| Azodicarbonamide blowing agent | 2 |
| Organotin stabilizer and blowing agent activator | 3 |

Separate mixtures for each example were then prepared using 200 parts of the above plastisol blend and 15 parts of one-sixteenth inch chips of regenerated cellulose film as follows:

| | |
|---|---|
| I. | Uncoated regenerated cellulose film containing no glycerine and less than 0.2% water. |
| II. | uncoated regenerated cellulose film containing no glycerine and approximately 7.0% water. |
| III. | Uncoated regenerated cellulose film containing approximately 10% glycerine and 7% water. |
| IV. | Commercially available nitrocellulose coated regenerated cellulose film containing both glycerine and water. |
| V. | Commercially available saran coated regenerated cellulose film containing both glycerine and water. |

The above mixtures were spread at a thickness of 25-30 mils by knife-blade technique onto a Teflon-coated glass fabric substrate and passed between two infrared heating panels in such a manner to promote decomposition of the blowing agent and curing of the plastisols; i.e., temperatures were 340° F. over a 3-minute interval.

Properties were then obtained in the resultant foams as follows:

The textured surface can best be described as a blistered leather grain or frog-skin leather. It differs in appearance somewhat in each of the examples in that it presents; perhaps, its best aesthetic appeal in example V.

EXAMPLE VI

A foamable plastisol was prepared having the following formulation:

| | Parts By Weight |
|---|---|
| Dispersion-type polyvinyl chloride resin | 50 |
| Polyvinyl chloride-maleate copolymer resin | 50 |
| Dioctyl phthalate (primary stabilizer) | 45 |
| Butylbenzyl phthalate (primary stabilizer) | 35 |
| Epoxidized soybean oil (secondary plasticizer) | 5 |
| Organotin (stabilizer and blowing agent activator) | 2 |
| Azodicarbonamide (blowing agent) | 2 |

A mixture was prepared using a portion of the above-described plastisol and 15 parts, by weight, of one-sixteenth inch chips of regenerated cellulose film containing 10 percent of glycerine as a plasticizer and 6.5 percent of absorbed moisture.

The remaining portion of the foamable plastisol and the mixture of foamable plastisol and regenerated cellulose film chips were spread by a knife-blade into layers onto separate portions of a carrier formed of Teflon coated glass fabric. Each of these layers was 30 mils in thickness and were both heated for 3 minutes by infrared panels which were at a temperature of about 350° F. and spaced 4 inches from the exposed sides of the carrier and applied layers, respectively.

The physical properties of the cellulose structures provided by the foamable plastisol, hereafter designated as Foam A, and the mixture of foamable plastisol and regenerated cellulose film chips, hereafter designated as Foam B, are set forth in the following table:

| Physical Property | Foam A | Foam B |
|---|---|---|
| Thickness, mils | 90 | 92 |
| Density, pounds per cubic ft. | 19.2 | 18.3 |
| Elongation, percent | 269 | 224 |
| Tensile strength, pounds per cubic ft. | 176 | 111 |
| Color | White | Deep Tan |
| Surface texture | Smooth | Coarse, resembling a grain leather |

EXAMPLE VII

A mixture was prepared substantially as described above, with the exception that the chips of regenerated cellulose film employed contained no plasticizer. This mixture was spread and heat treated as in example VI. The physical properties of the resulting cellular structure were substantially the same as Foam B of example VI with the exception that the structure itself was white in color.

EXAMPLE VIII

A mixture was prepared substantially as described in example VI, with the exception that bone dry chips of regenerated cellulose film were employed. This mixture was spread and heat treated as described above. The physical properties of the resulting cellular structure were substantially the same as Foam B of example VI, with the exception that the foamed surface was smooth and resembled Foam A in texture.

| Example: | Thickness, mils | Density, pounds/cu. ft. | Elongation, percent | Tensile Strength, pounds/sq. ft. | Color | Surface |
|---|---|---|---|---|---|---|
| I | 114 | 18.1 | 233 | 142 | White | Smooth. |
| II | 105 | 17.0 | 179 | 114 | do | Textured. |
| III | 121 | 17.5 | 159 | 83 | Tan | Do. |
| IV | 100 | 18.2 | 179 | 102 | Tan | Do. |
| V | 126 | 18.1 | 173 | 102 | Tan | Do. |

It is to be understood that changes and variations may be made without departing from the spirit and scope of the invention as defined in the appended claims.

I claim:

1. A method of making a cellular structure having a decorative, grained surface including the steps of forming a fluid, foamable plastisol by together incorporating a vinyl resin, a plasticizer for such resin and chemical blowing agent, mixing into the foamable plastisol chips of regenerated cellulose film containing absorbed water, the ratio of said chips of regenerated cellulose film to said plastisol being in the range of from 1:10 to 1:100, by weight, and heating the mixture of foamable plastisol and chips of regenerated cellulose film to a temperature sufficient to decompose the chemical blowing agent, cure the foamed plastisol and cause the chips of regenerated cellulose film to blister and thereby impact to the resulting structure a grained surface.

2. A method as defined in claim 1 wherein said chips of regenerated cellulose film further include a plasticizer which, during heating of said mixture, imparts a tan, leatherlike coloration to the foaming plastisol and resulting cellular structure.

3. A method as defined in claim 1 wherein said chips of regenerated cellulose film contain from about 0.1 to 10.0 percent of absorbed water.

4. A method as defined in claim 3 wherein said chips of regenerated cellulose film are of such size as to pass through mesh screens ranging from less than about one thirty-second to one-fourth inch.

5. A method as defined in claim 4 wherein said chips of regenerated cellulose film further includes from about 5.0 to 15.0 percent of plasticizer which, during the heating of said mixture, imparts a tan, leatherlike coloration to the foaming plastisol and resulting cellular structure.

6. A method as defined in claim 4 wherein said mixture of foamed plastisol and chips of regenerated cellulose film is cured while in the form of a layer having a thickness of from about 5.0 to 100.0 mils.

7. A method as defined in claim 6 wherein said mixture is concomitantly cured and bonded to a substrate during heating thereof to provide a laminated structure.

* * * * *

UNITED STATES PATENT OFFICE
CERTIFICATE OF CORRECTION

Patent No. 3,639,160   Dated February 1, 1972

Inventor(s) Dorsey C. Nelson

It is certified that error appears in the above-identified patent and that said Letters Patent are hereby corrected as shown below:

Col. 1, line 19 "ternately" should read --ternatively--; line 33, after "a" insert --method for making a--. Col. 2, line 44, "an" should read --a--; line 50, after "chips" insert --of--. Col. 3, in the last table, "sq.ft." should read --sq.in.--. Col. 4, line 32, "cellulose" should read --cellular--. Col. 5, line 16, "impact" should read --impart--.

Signed and sealed this 27th day of June 1972.

(SEAL)
Attest:

EDWARD M. FLETCHER, JR.
Attesting Officer

ROBERT GOTTSCHALK
Commissioner of Patents